United States Patent
Yamamoto

(10) Patent No.: US 6,282,380 B1
(45) Date of Patent: Aug. 28, 2001

(54) POSITION CONTROL APPARATUS, FOCUS ADJUSTMENT APPARATUS AND CAMERA

(75) Inventor: Harushige Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/467,858

(22) Filed: Dec. 20, 1999

(51) Int. Cl.⁷ ............................. G03B 13/36; G05B 19/40
(52) U.S. Cl. ........................ 396/97; 396/133; 318/634; 318/685
(58) Field of Search ..................... 396/97, 133; 318/632, 318/634, 685, 696

(56) References Cited

U.S. PATENT DOCUMENTS 5,892,989 * 4/1999 Kawasaki et al. ............... 396/133 X
5,917,303 * 6/1999 Depatie et al. ....................... 318/685
6,144,805 * 11/2000 Ogino ................................. 396/97 X

* cited by examiner

Primary Examiner—W. B. Perkey
(74) Attorney, Agent, or Firm—Robin, Blecker & Daley

(57) ABSTRACT

A position control apparatus includes a stepping motor, a lead screw arranged to be rotated by the stepping motor being driven, a moving member arranged to move according to rotation of the lead screw, a first detecting device which detects that the moving member passes a particular position, a second detecting device which detects that the lead screw passes a particular rotating position, and a determination device which determines an amount of deviation of the moving member from a reference position on the basis of outputs from the first detecting device and the second detecting device.

30 Claims, 7 Drawing Sheets

FIG.2(a)
TWO-PHASE DRIVING (FULL STEP)
18 DEG/STEP
FIG.2(b)
ONE-TWO-PHASE DRIVING (HALF STEP)
9 DEG/STEP
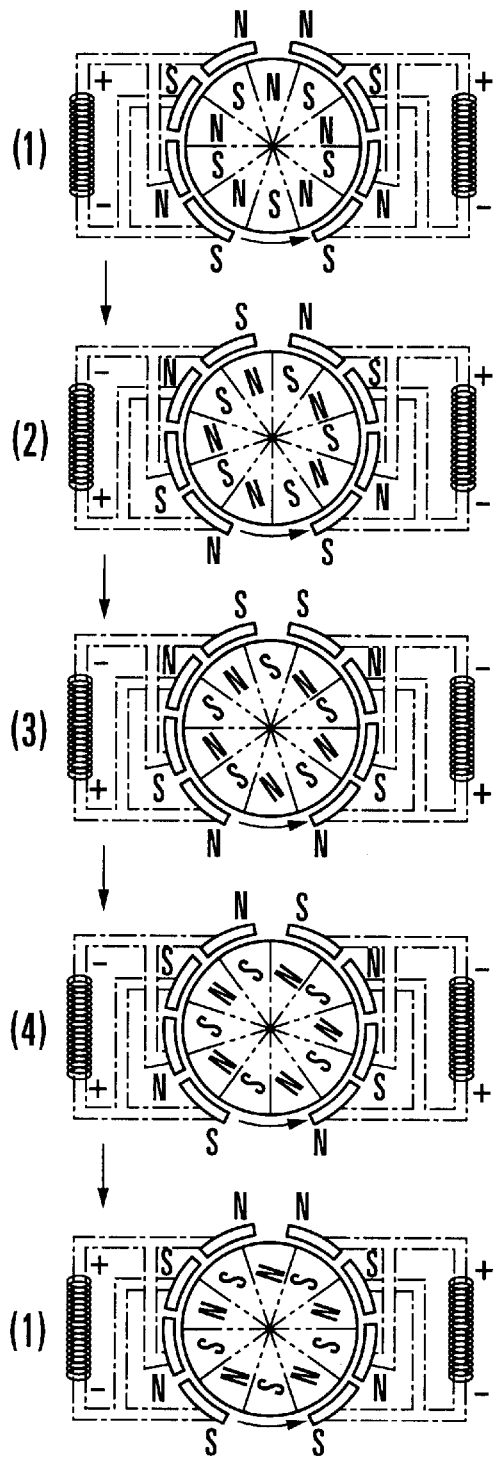
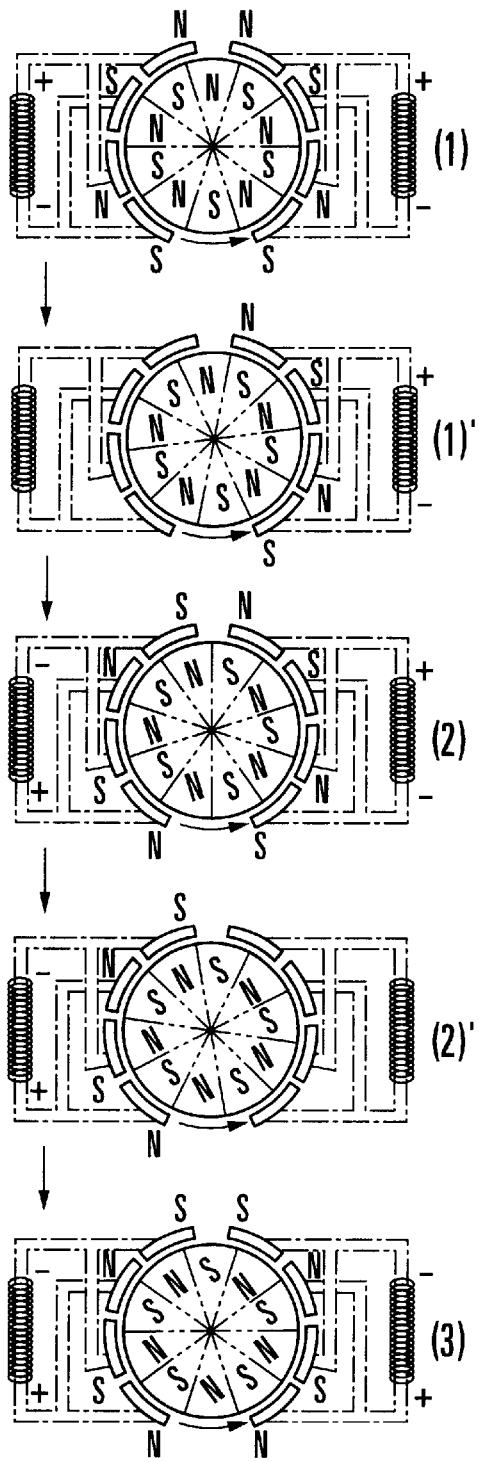

POSITION CONTROL APPARATUS, FOCUS ADJUSTMENT APPARATUS AND CAMERA

BACKGROUND OF THE INVENTION

1. Field of the Invention

The present invention relates to an improvement on a position control apparatus, a focus adjustment apparatus and a camera, for controlling the position of a moving member.

2. Description of Related Art

As methods for controlling the position of a lens barrel, there is known, as disclosed in Japanese Laid-Open Patent Application No. HEI 8-122617, a mechanism arranged such that a reference position of a lens barrel in the optical axis direction is decided by a discrimination means which is arranged to decide one reference position and, after that, an extent to which the lens barrel is to be drawn out is controlled by reading, with a photo-interrupter, the rotating position of a pulse plate (disk) provided on the shaft of a motor.

Some of cameras having zoom lenses are arranged to vary a photo-taking magnification by varying the positions of at least two lens groups in the optical axis direction. It is known that, in a camera of this kind, a drive source such as a stepping motor is arranged integrally with a first lens group to be capable of driving and moving a second lens group in the optical axis direction, the position of the second lens group in the optical axis direction is computed and obtained from information on the focal length of the photo-taking lens and information on a distance to an object to be photographed, and the second lens group is controlled and driven by the drive source to the computed position. A photo-taking lens barrel arranged in this manner obviates the necessity of a conventional mechanism called a mechanical cam mechanism which is arranged to control lens positions in the optical axis direction by means of cam grooves formed in a cam tube and rectilinear motion guide grooves formed in a rectilinear motion guide tube.

Generally, the structural arrangement described above is called an electronic zoom mechanism. In brief, the electronic zoom mechanism is arranged as follows.

Information on the focal length varied by a magnification varying action on the photo-taking lens is detected by a known position detecting means. A distance to the object to be photographed is detected by a known distance detecting means. The position of the second lens group relative to the first lens group necessary for focusing on the object is decided by these processes. The first lens group is provided with a detector for detecting the position of a part which is arranged at the second lens group to be detected by the detector. When a shutter release operation is performed by the camera user, the second lens group is driven to the position decided in relation to the first lens group on the basis of a detection signal of the detector.

BRIEF SUMMARY OF THE INVENTION

According to one aspect of the invention, there is provided a position control apparatus having a stepping motor, a lead screw arranged to be rotated by the stepping motor being driven and a moving member arranged to move according to rotation of the lead screw, the position control apparatus comprising a first detecting device which detects that the moving member passes a particular position, a second detecting device which detects that the lead screw passes a particular rotating position, and a determination device which determines an amount of deviation of the moving member from a reference position on the basis of outputs from the first detecting device and the second detecting device, so that it is possible to detect a larger amount of deviation than the above-stated arrangement of the prior art.

The above and further aspects and features of the invention will become apparent from the following detailed description of preferred embodiments thereof taken in connection with the accompanying drawings.

BRIEF DESCRIPTION OF THE SEVERAL VIEWS OF THE DRAWING

FIGS. 2(*a*) and 2(*b*) are diagrams for explaining the operation of a stepping motor which is composed of a two-phase coil part and a ten-pole magnet, according to the first embodiment of the invention.

DETAILED DESCRIPTION OF THE INVENTION

Hereinafter, preferred embodiments of the invention will be described in detail with reference to the drawings.

Figure 1:
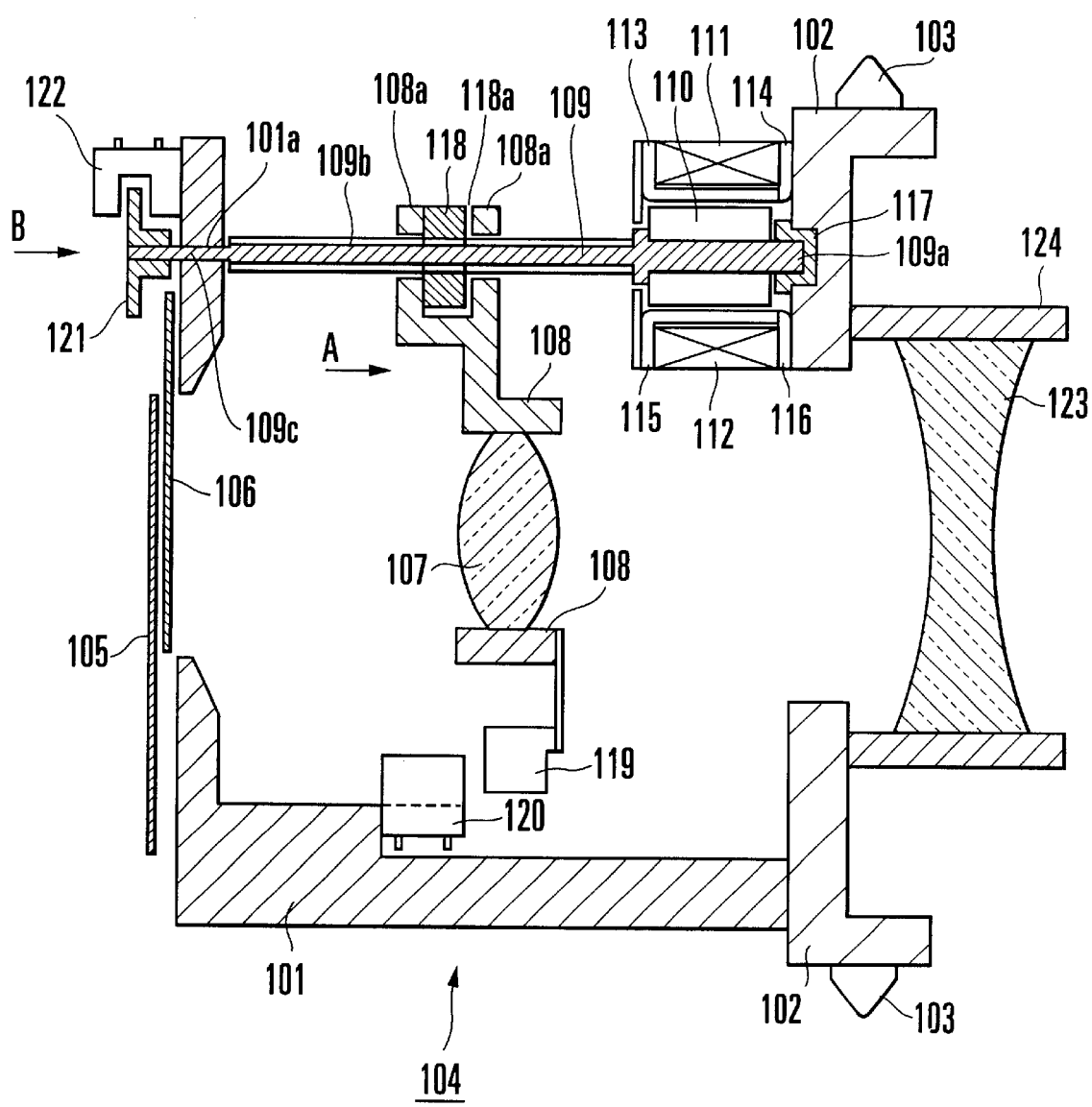
FIG. 1 is a sectional view showing essential parts of a camera according to a first embodiment of the invention.

FIG. 1 shows, in a sectional view, essential parts of a camera according to a first embodiment of the invention. Referring to FIG. 1, a shutter base plate 101 carries a shutter mechanism which includes shutter blades 105 and 106. A rear base plate 102 is secured to the shutter base plate 101. To the rear base plate 102 is secured a first lens group 123 which is held by a lens holding member 124. A cam pin 103 is secured to the outer surface of the rear base plate 102.

The cam pin 103 is arranged to be driven by the action of a cam tube and a rectilinear motion guide tube to move to a predetermined position. With the cam pin 103 driven, an optical unit 104 which is composed of the shutter base plate 101 and the rear base plate 102 is driven and controlled in the optical axis direction.

A focusing lens group 107 is held by a focusing lens group holder 108. The focusing lens group holder 108 is arranged to be movable in the optical axis direction in a state of being carried by a support means which is fixedly disposed between the shutter base plate 101 and the rear base plate 102. Reference numeral 109 denotes a lead screw. To one end part of the lead screw 109 on the side of the rear base plate 102 is secured a permanent magnet 110 which is a rotor of a stepping motor.

Two driving coils 111 and 112 are provided on the outer circumferential side of the permanent magnet 110. The driving coils 111 and 112, a pair of stator yokes 113 and 114 and another pair of stator yokes 115 and 116 are arranged to form a magnetic circuit for the stepping motor. A bearing metal part 117 is secured, by press fitting or the like, to the rear base plate 102. The lead screw 109 is thus arranged to be rotatably carried by the bearing metal part 117 at its end part 109a on the side of the rear base plate 102. A male thread is formed at the screw part 109b of the lead screw 109 to be in mesh with a nut member 118.

The nut member 118 is carried by a nut holding part 108a formed at the focusing lens group holder 108. When the lead screw 109 is caused to rotate by the stepping motor, the rotation of the lead screw 109 causes the focusing lens group holder 108 to move in the optical axis direction in the state of holding the focusing lens group 107. At this time, since the focusing lens group holder 108 is biasedly urged in the direction of an arrow A by a spring or the like, the focusing lens group 107 can be moved without any deviation that otherwise might be caused to take place in the optical axis direction by a play or clearance 118a existing between the nut member 118 and the nut holding part 108a.

A position detecting member 119 which is provided for position detection is secured to the focusing lens group holder 108. To detect passing of the position detecting member 119, a first photo-interrupter 120 (hereinafter referred to as the first PI 120) is secured to the shutter base plate 101 on the moving locus of the position detecting member 119. The position of the focusing lens group 107 in the optical axis direction is detected jointly by the position detecting member 119 and the first PI 120. The focusing lens group 107 is then driven by the stepping motor to a target position.

In the above-described arrangement, if the position of the first PI 120 is caused to vary by a change of temperature, for example, the amount of deviation of the position of the first PI 120 can be detected and corrected if the deviation is within a range of deviation, as will described below.

FIGS. 2(a) and 2(b) are diagrams for explaining actions of the stepping motor composed of two-phase coils and a ten-pole magnet.

FIG. 2(a) shows the action of a mode of operation called the two-phase driving (full-step driving). In the two-phase driving, a current is constantly applied to the two coils and the rotor magnet is driven to rotate by changing the energizing phase from one phase over to another. The feed angle of the two-phase driving is 18 degrees per step. As shown in FIG. 2(a), an energizing process to the coils is repeated in a cycle in the sequence of positions (1)→(2)→(3)→(4) in that order. According to the energizing process, the rotor magnet rotates counterclockwise by sequential steps (in the direction of an arrow shown in FIG. 28a)). When the energizing sequence is reversed, the magnet rotor rotates clockwise in the manner reverse to the above process.

FIG. 2(b) shows the action of another mode of operation called the one-two-phase driving (half-step driving). In the one-two-phase driving, the rotor magnet is driven at a feed angle which is one half of the feed angle of the two-phase driving. In other words, the feed angle of the one-two-phase driving is 9 degrees. As shown in FIG. 2(b), an energizing process is performed in such a manner that energizing positions (1)', (2)', (3)' and (4)' ((3)' and (4)' being not shown) in which one of the two coils is not energized are inserted between the energizing positions (1), (2), (3) and (4) of the two-phase driving.

Although it is not shown in FIG. 2(b), the energizing position (3)' is obtained by not energizing the coil on the left side of the energizing position (3) shown in FIG. 2(a). Also, the energizing position (4)' is obtained by not energizing the coil on the right side of the energizing position (4) shown in FIG. 2(a).

In the case of the one-two-phase driving as shown in FIG. 2(b), the coils are energized in a cycle to obtain the above-stated positions in the sequence of (1)→(1)'→(2)→(2)'→(3)→(3)'→(4)→(4)' in that order. According to the energizing process, the magnet rotor rotates counterclockwise as viewed in FIG. 2(b). If the energizing sequence is reversed, the magnet rotor comes to rotate clockwise.

Now, it is assumed that the permanent magnet 110 of the stepping motor for driving the focusing lens group holder 108 in the optical axis direction is composed of the magnet rotor which is magnetized to have 10 poles, and that the coils 111 and 112 are energized in the above-stated pattern of the one-two-phase driving. In this instance, one turn of the magnet rotor is composed of 40 steps since the feed angle thereof per step is 9 degrees.

The focusing lens groups of compact cameras of zoom type of these days are trending to have a higher focus sensitivity under the influence of efforts being made in general to reduce the sizes of cameras and yet to increase their rates of magnification. Therefore, for feed control in moving a focusing lens group with a stepping motor or the like, it has become necessary to more finely arrange the amount of feed per step. If the amount of feed per step as required is 5 μm, for example, the screw pitch of the male screw 109b of the lead screw 109 and the nut member 118 becomes "5 μm×40 steps=0.2 mm".

In the arrangement described above, in a case where a point of time when the position detecting member 119 comes to pass the first PI 120 varies under variable ambient temperature, the amount of feed is corrected in a manner as described below.

Figure 3:
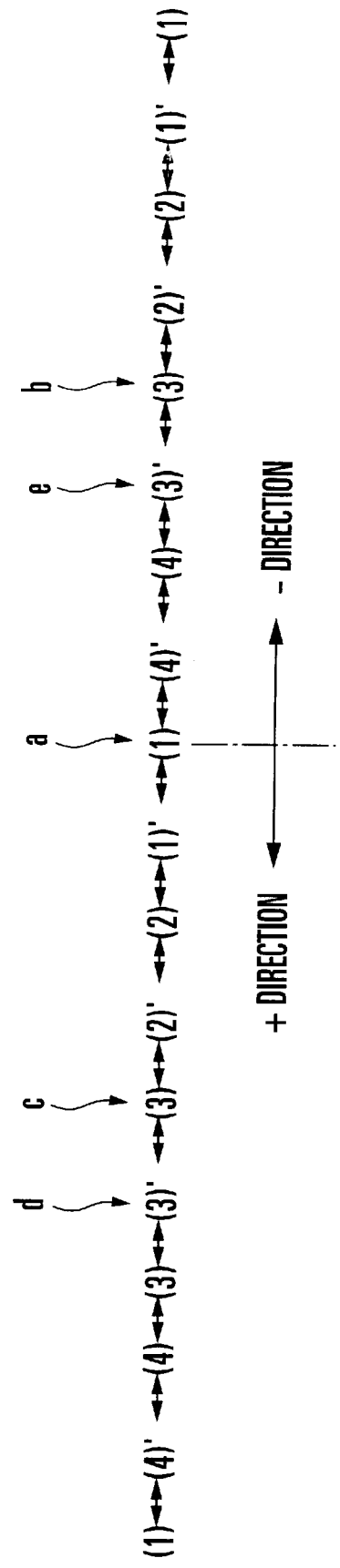
FIG. 3 is a diagram for explaining a pattern of energizing the stepping motor by one-two-phase driving in the first embodiment of the invention.

FIG. 3 shows the energizing pattern of the one-two-phase driving mentioned above.

Now, it is assumed that the position detecting member 119 is arranged to pass the first PI 120 at an energizing phase "a" as shown in FIG. 3. When the position of the first PI 120 is caused to vary by the thermal expansion or contraction of the shutter base plate 101 under variable ambient temperature, for example, the phase of energizing pattern to be obtained when the position detecting member 119 pass the first PI 120 changes and deviates from a correct phase. If this change, or deviation, is within a range defined by the energizing phases (3) indicated by reference symbols "c" and "b" in FIG. 3, that deviation can be corrected. Since the amount of feed per step is 5 μm as mentioned above, the feed control can be accomplished by correcting the deviation within a range of ±3 steps before and after the energizing phase "a", i.e., ±15 μm. The reason for this is that the direction in which the deviation takes place can be found from a difference between energizing phase patterns such as (1)→(1)'→(2)→(2)' or (1)→(4)'→(4)→(3)', as shown in FIG. 3.

However, if the change or deviation is ±4 steps, i.e., ±20 μm, for example, energizing phases obtained at the ends of this range are both at the phase (3). In this case, therefore, the energizing phases "b" and "c" shown in FIG. 3 cannot be discriminated from each other. In the event of a further deviation of ±5 steps or more, there is a possibility that the correcting action is performed in a direction reverse to a correct direction. For example, if a change of temperature, in this case, causes the position detecting member 119 to pass the first PI 120 at a point (3)' which is an energizing phase "d" in actuality as shown in FIG. 3, the correction system might mistake it for another point (3)' which represents an energizing phase "e". In the event of such a mistake, correction by −5 steps (which should be made in the right direction as viewed in FIG. 3) is erroneously replaced with correction by +3 steps (which should be made in the left direction as viewed in FIG. 3). This mistake then results in an error of the amount of feed by +8 steps.

In other words, for such a correction system, the positional deviations due to changes of temperature or the like must be suppressed not to exceed ±15 μm. However, it has been ascertained through tests that, in actual use of the camera, a change of room temperature from 20° C. to minus 10° C. causes the position of the first PI 120 to change or deviate by more than 10 μm. This value of deviation is computed on the basis of the linear expansion coefficient α of a polycarbonate resin material used for the camera. This coefficient is computed as follows:

$$\alpha = 2.8 \sim 5.6 \times 10^{-5} \text{ cm/cm} \cdot ^\circ \text{ C.}$$

It was found that a positional deviation of about 8 to 17 μm per cm takes place due to the changes of temperature.

Therefore, since the position of the first PI 120 changes to an extent exceeding the allowable limit of 15 μm at the temperature of environment under which the camera is expected to be used, it is hardly possible to substantially correct the amount of moving (feeding) the focusing lens group 107.

In view of the above-mentioned point, the first embodiment is arranged to carry out the feed control by using a second detector in addition to the first detector described above. The second detector is described as follows.

Referring to FIG. 1, one end part 109c of the lead screw 109 is rotatably carried by a fitting engagement hole 101a of the shutter base plate 101. A pulse plate 121 which rotates integrally with the lead screw 109 is secured to the fore end part of the lead screw 109 by press fitting or the like. The rotation of the pulse plate 121 is arranged to be detected by a second photo-interrupter 122 (hereinafter referred to as the second PI 122).

Figure 4:
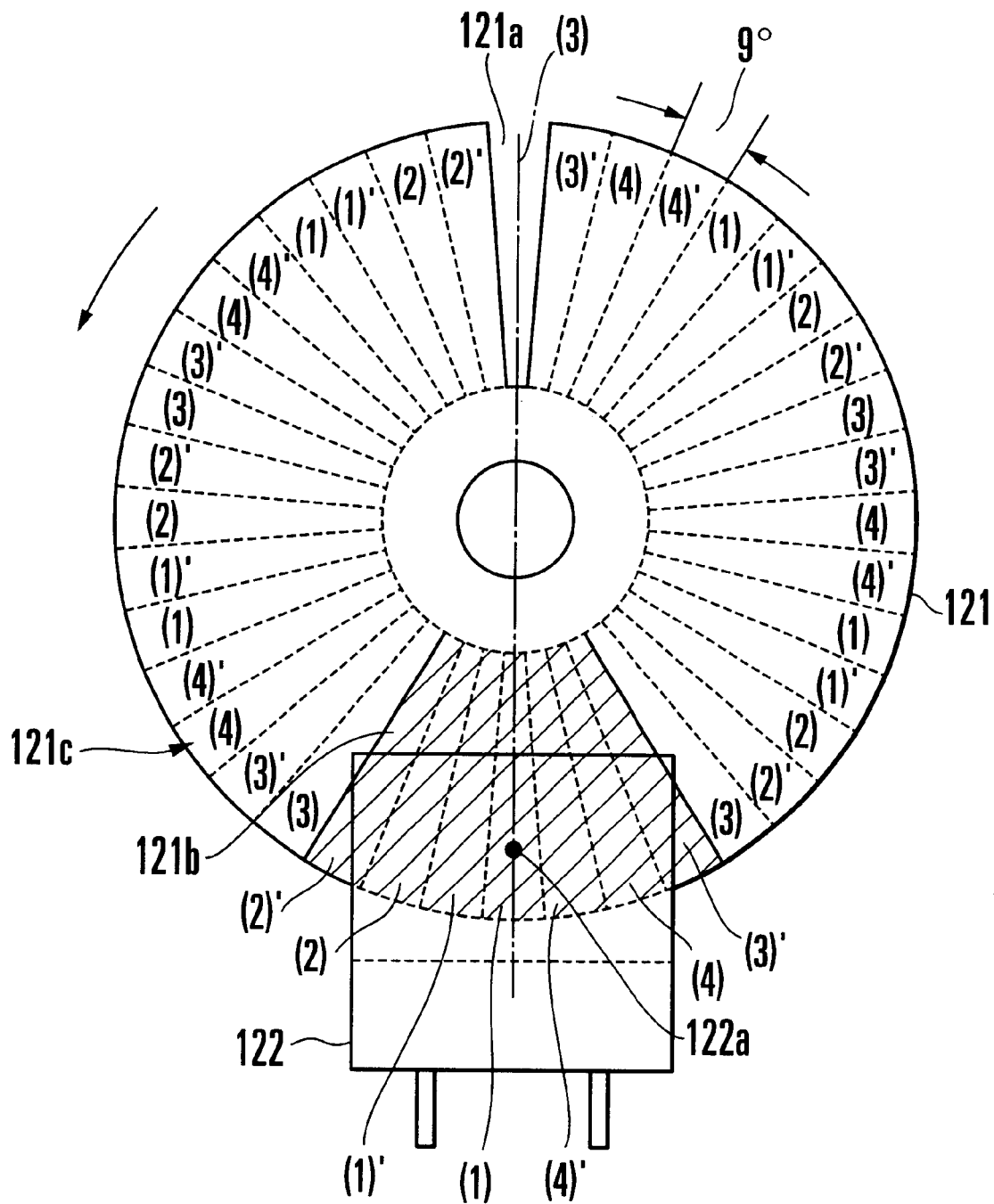
FIG. 4 is a front view showing a second photo-interrupter and a pulse plate in a state obtained the instant a position detecting member has passed a first photo-interrupter in the first embodiment of the invention.

FIG. 4 is a plan view taken in the direction of an arrow B in FIG. 1 to show the second PI 122 and the pulse plate 121 in a state obtained the instant the position detecting member 119 passes the first PI 120.

The pulse plate 121 is provided with a cutout 121a which is set to, in this instance, come to a symmetric position differing 180 degrees as viewed from the second PI 122. It is assumed that the coil energizing phase of the stepping motor is (1), for example, when the cutout 121a comes to the symmetric position. Since the pulse plate 121 rotates integrally with the lead screw 109, the rotation angle per step of the stepping motor obtained by the one-two-phase driving is 9 degrees. In FIG. 4, for the convenience of explanation, a pattern of energizing phases is shown in the sector areas of the pulse plate 121 obtained by dividing the pulse plate 121 at every 9 degrees. More specifically, in FIG. 4, a pattern of energizing phases to be detected by the detecting part 122a of the second PI 122 is shown on the pulse plate 121 assuming that the energizing phase obtained the instant the passing of the position detecting member 119 is detected by the first PI 120 is (1). After that, with the energizing process allowed to advance in the sequence of energizing phases (1)', (2), (2)', (3), (3)', - - - , the pulse plate 121 rotates to bring the energizing phases shown on the pulse plate 121 to the detecting part 122a of the second PI 122. In short, the pulse plate 121 serially rotates counterclockwise step by step. Then, at the twentieth step after detection of the energizing phase (1), the cutout 121a of the pulse plate 121 being rotated reaches the position corresponding to the detecting part 122a of the second PI 122, so that the position of the cutout 121a of the pulse plate 121 is detected by the cutout 121a of the pulse plate 121.

In FIG. 4, the range within which the positional deviations due to changes of temperature of the position detecting member 119 and the first PI 120 are correctable is represented by a hatched part 121b. This correctable range 121b includes ±3 steps. As described in the foregoing, the amount of feeding (moving) the focusing lens group 107 becomes uncorrectable when the extent of deviation exceeds this correctable range 121b. However, the above-stated correctable range can be widened by the use of the pulse plate 121 and the second PI 122.

For example, it is assumed that the passing of the position detecting member 119 is detected by the first PI 120 at a position (4) which deviates by 6 steps in the energizing (phase) pattern, as indicated by reference numeral 121c in FIG. 4, due to a change of temperature or the like, while the passing of the position detecting member 119 should be detected by the first PI 120 at the phase position (1) in the energizing pattern. In this case, the deviation cannot be corrected by the above-stated arrangement of the position detecting member 119 and the first PI 120 alone.

However, the arrangement of the first embodiment having the pulse plate 121 and the second PI 122 is capable of correcting the deviation as described below.

After the passing of the position detecting member 119 is detected by the first PI 120 at phase (4) of the energizing pattern indicated by reference numeral 121c in FIG. 4, when the stepping motor is caused to rotate further counterclockwise as mentioned above, the cutout 121a of the pulse plate 121 is detected by the second PI 122 after 14 steps.

At this moment, it is possible to find that the detection is made when feeding is made only by 14 1steps while the detection should be made after feeding by 20 steps. In other words, the detection made after an amount of feed which is less by 6 steps than the correct number of feeding steps can be detected on the side of the camera body. Therefore, the feed control over the focusing lens group 107 can be accurately accomplished by correcting the amount of feed by 6 steps corresponding to the amount of deviation. The maximum number of steps correctable in this manner is ±19 steps. Any amount of positional deviation within this range is correctable.

The above-stated 19 steps correspond to an amount of feed of ±95 μm of the lead screw 109 in moving the focusing lens group 107. Compared with the correctable range of ±15 μm of the system composed of only the position detecting member 119 and the first PI 120 mentioned in the foregoing, this correctable range is much wider and is sufficient for practical applications.

As regards the expansion and contraction of the lead screw 109 under variable ambient temperature, feed control can be more accurately carried out by presetting various correction amounts for various temperatures, by detecting outside air temperature with a temperature sensor and by making correction at the correction amount applicable to the temperature detected.

In a case where abrasion takes place at contact parts of the metal bearing part 117 and the end part 109a of the lead screw 109 shown in FIG. 1, the whole lead screw 109 shifts to the right, as viewed in FIG. 1, to an extent which corresponds to an amount of shavings caused by the abrasion. This results from the bias urging force of known urging means such as a spring on the focusing lens group holder 108, because the lead screw 109 is also biasedly urged through the nut member 118 to the right as viewed in FIG. 1. In that event, although there is no change in the positions of the position detecting member 119 and the first PI 120, the pattern of energizing the stepping motor comes to change. The change in the energizing pattern tends to be mistaken for a change in position of the first PI 120.

With the energizing pattern caused to change by the above-stated abrasion, correction of deviation would result in wrong feed control. Therefore, if the energizing pattern is found to have changed at a normal temperature by using a temperature sensor provided on the camera, the change of the energizing pattern is judged to have resulted from the abrasion and no correction is made. By virtue of this arrangement, a system can be prepared to perform no erroneous control in this respect.

It is also possible to carry out beforehand, at the time of assembling the camera, some process like a so-called break-in process to bring about abrasion at the above-stated contact parts to such a degree that the abrasion would not advance any further. That arrangement also gives a system which is free from the adverse effect of the abrasion of the contact parts mentioned above.

Figure 5:
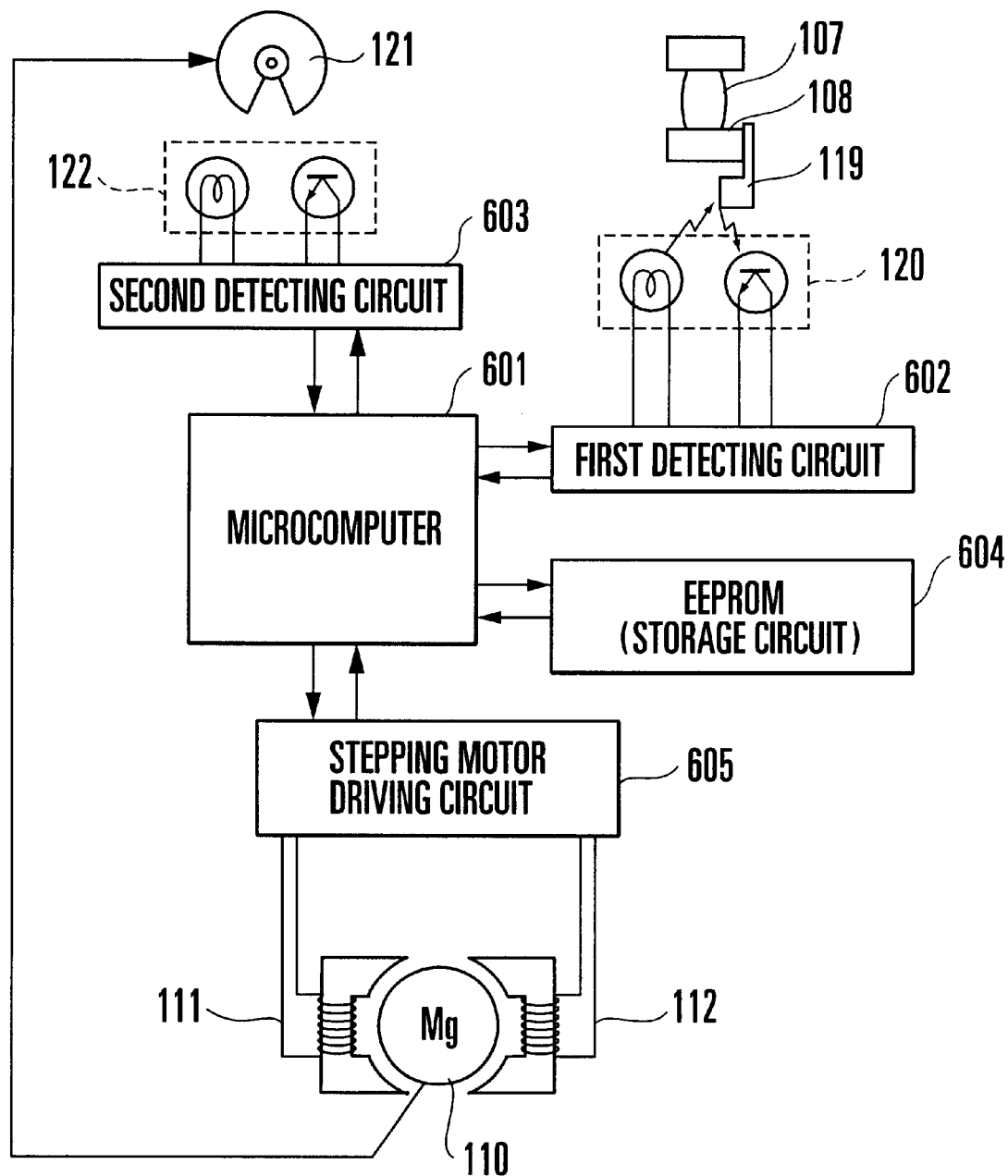
FIG. 5 is a block diagram showing the electrical arrangement of main parts of the camera in the first embodiment of the invention.

FIG. 5 is a block diagram showing the circuit arrangement of essential parts of the camera having the structural arrangement described above. All members that have already been described in the foregoing are indicated with the same reference numerals, and the details of them are omitted from the following description.

Referring to FIG. 5, a microcomputer 601 is arranged to control various actions of the camera. A first detecting circuit 602 is arranged to drive the first PI 120 and to send the output thereof to the microcomputer 601. A second detecting circuit 603 is arranged to drive the second PI 122 and also to send the output thereof to the microcomputer 601. An EEPROM 604 is a storage circuit. A stepping motor driving circuit 605 is arranged to drive the stepping motor.

Figure 6:
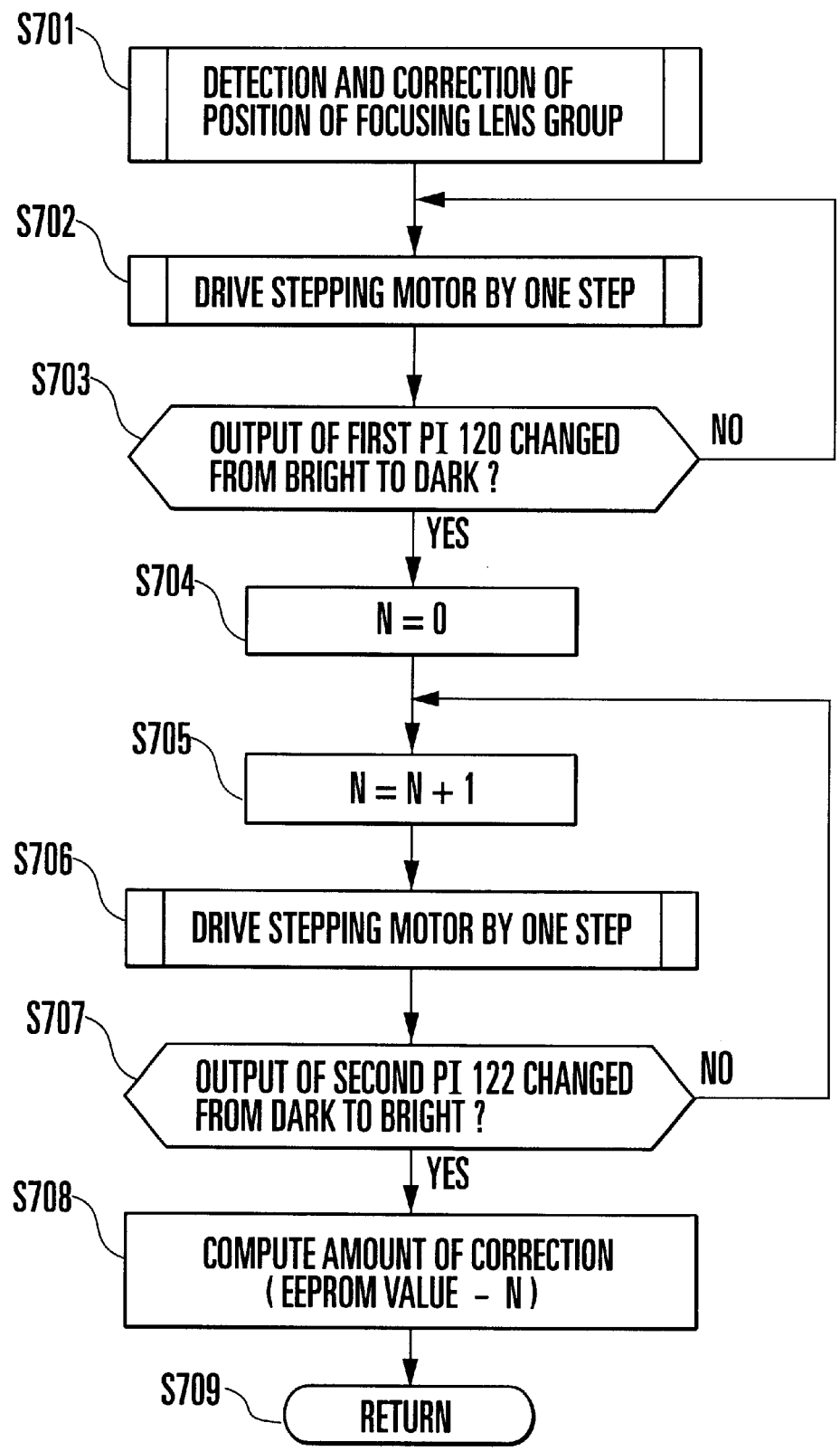
FIG. 6 is a flow chart showing an operation of the camera performed in detecting the position of a focusing lens group and deciding an amount of correcting a focusing lens moving action in the first embodiment of the invention.

FIG. 6 is a flow chart showing the operation of the first embodiment performed in detecting the position of the focusing lens group 107 and deciding an amount of correcting the amount of feeding (moving) the focusing lens group 107. The flow of the operation is described with reference to FIG. 6 as follows.

At a step S701, the microcomputer 601 starts to execute a subroutine of detecting the position of the focusing lens group 107 and deciding an amount of correcting the position of the focusing lens group 107. At a step S702, the stepping motor driving circuit 605 is caused to drive the stepping motor to feed the focusing lens group 107 by one step. At the next step S703, a check is made for a change in the signal from the first PI 120 through the first detecting circuit 602. In other words, a check is made to find if the output of the first PI 120 has changed from a bright state to a dark state. If not, the flow of operation returns to the step S702 to cause the stepping motor to continue its feeding action. After that, when a signal from the first detecting circuit 602 comes to indicate a change of the output of the first PI 120 from a bright state to a dark state at the step S703, that is, when the position detecting member 119 has reached the position of the first PI 120 (thus showing arrival of the focusing lens group 107 at the reference position), the flow proceeds from the step S703 to a step S704. At the step S704, a counter N which is disposed within the microcomputer 601 is reset. At the next step S705, the count value of the counter N is incremented (advanced) by one.

At the next step S706, the stepping motor is driven forward by one step. At a step S707, the microcomputer 601 this time makes a check for a change of the output signal of the second PI 122 through the second detecting circuit 603. If the output signal of the second PI 122 is found to have changed (from a dark state to a bright state). If not, the flow returns to the step S705 to increment the count value of the counter N by one, allowing the stepping motor to carry on its feeding action at the step S706. When the output signal of the second PI 122 is found at the step S707 to have changed to indicate arrival at the cutout part 121a, the flow immediately proceeds from the step S707 to a step S708.

While the camera is in the stage of manufacture, a value obtained during a period from detection of a change in the output signal of the first PI 120 until detection of a change in the output signal of the second PI 122 is stored in the EEPROM 604 (a design target value is "20"). At the step S708, a difference between the design target value and the count value of the counter N, i.e., "20−N" is considered to be the number of correction steps. The number of correction steps is used for control over the amount of feeding the focusing lens group 107. Then, the flow of operation then quits this subroutine.

The arrangement of the first embodiment of the invention described above permits accurate correction of errors in amount of feeding the focusing lens group, which are caused by variable environmental conditions or changes due to ageing and has been hardly correctable by the conventional arrangement.

Figure 7:
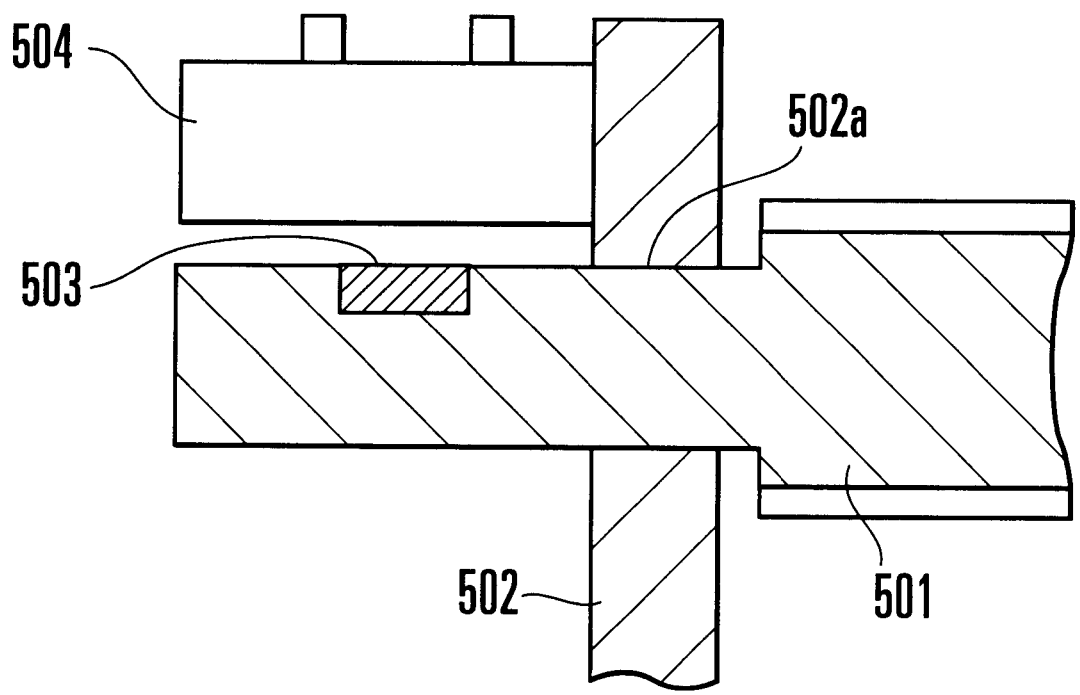
FIG. 7 is a sectional view showing the arrangement of essential parts of a camera according to a second embodiment of the invention.

FIG. 7 is a sectional view showing the arrangement of essential parts of a camera according to a second embodiment of the invention. The parts shown in FIG. 7 correspond to the pulse plate 121 and the second PI 122 in the first embodiment described above.

Referring to FIG. 7, the fore end of a lead screw 501 is rotatably carried by a fitting engagement hole 502a provided in a shutter base plate 502. The fore end part of the lead screw 501 which pierces through the shutter base plate 502 has a magnetic 503 secured thereto as one unified body therewith. A magnetic sensor 504 is arranged to detect the passage of the magnet 503 at the front part of the magnetic sensor 504.

The magnet 503 and the magnetic sensor 504 are arranged in combination to be capable of carrying out the same function as the function performed by the pulse plate 121 and the second PI 122 in the first embodiment described in the foregoing. Further, in this case, a part of the lead screw 501 may be magnetized to have the same function as the function of the magnet 503.

The arrangement of the second embodiment permits the detecting part described in the foregoing to be arranged in a different manner. Therefore, the arrangement of the second embodiment serves to enhance the practicability of the detecting part arranged in accordance with the invention.

The invention is not limited to the embodiments disclosed but is intended to cover various modifications and equivalent arrangements to be made within the scope of technology of the invention. For example, if the concept of the embodiments disclosed in the foregoing is changed to have the position detecting member 119 formed with a pressed plate and secured to the focusing lens group holder 108 by adhesion means or the like, the detected position tends to deviate when the adhesion means is caused to peel off by repeated changes of temperature or a shock inflicted thereon with the camera accidentally dropped or when the pressed plate deforms.

On the other hand, possible deviations of detection made by the pulse plate 121 result solely from the shavings of the metal bearing part resulting from abrasion and from the expansion and contraction of the lead screw 109 caused by changes of temperature as mentioned above. The deviation due to the shavings at the metal bearing part is arranged to be prevented by carrying out a break-in process to eliminate the possibility of further having the shavings as mentioned in the foregoing. As for deviations due to changes in temperature, the correction can be made by using amounts of expansion and contraction obtained from a linear expansion coefficient according to outside air temperature.

In the arrangement described above, the feed control over the focusing lens group may be changed as follows. The position of the pulse plate 121 detected by the second PI 122 after detection by the first PI 120 is set as a reference position and, after that, the feed control is performed by correcting only the amount of expansion and contraction of the lead screw 109 caused by the changes of temperature.

In the embodiments disclosed, the amount of deviation due to changes of temperature, etc., is corrected by counting the number of steps of the stepping motor and by comparing the count value thus obtained with a target value stored in the EEPROM. However, this arrangement of course can be changed to perform control on the basis of time, because a length of time required for driving by one step is beforehand known.

The reference position obtained by the first PI 120 may be set at a physical abutting position.

While the embodiments disclosed are arranged to use a stepping motor as a drive source for driving the focusing lens group, the stepping motor may be replaced with an ordinary DC motor or the like.

In the cases of the embodiments disclosed, the invention is applied to cameras. However, the invention is applicable also to other focus adjustment apparatuses and position control apparatus having moving members such as lenses or the like.

Further, the software arrangement and hardware arrangement of the embodiments described in the foregoing can be interchanged as desired.

What is claimed is:

1. A position control apparatus comprising:
   a) a stepping motor;
   b) a lead screw arranged to be rotated by said stepping motor being driven;
   c) a moving member arranged to move according to rotation of said lead screw;
   d) a first detecting device which detects that said moving member passes a particular position;
   e) a second detecting device which detects that said lead screw passes a particular rotating position; and
   f) a determination device which determines an amount of deviation of said moving member from a reference position on the basis of outputs from said first detecting device and said second detecting device.

2. A position control apparatus according to claim 1, wherein said determination device determines the amount of deviation of said moving member from the reference position on the basis of (i) an energizing phase of said stepping motor obtained at a point of time when said first detecting device has detected that said moving member has passed the particular position and (ii) the number of pulses supplied to said stepping motor during a period from a point of time when said first detecting device has detected that said moving member has passed the particular position until a point of time when said second detecting device has detected that said lead screw has passed the particular rotating position.

3. A position control apparatus according to claim 1, further comprising a correcting device which corrects the amount of deviation determined by said determination device.

4. A position control apparatus according to claim 1, wherein a cycle in which said first detecting device detects that said moving member passes the particular position differs from a cycle in which said second detecting device detects that said lead screw passes the particular rotating position.

5. A position control apparatus according to claim 1, wherein said first detecting device includes a detection part provided at said moving member, and a sensor which detects passage of said detection part.

6. A position control apparatus according to claim 1, wherein said first detecting device includes a detection part provided at said moving member, and a photo-sensor which optically detects passage of said detection part.

7. A position control apparatus according to claim 1, wherein said second detecting device includes a rotary disk having a cutout formed therein and fixed to said lead screw, and a sensor which detects passage of said cutout.

8. A position control apparatus according to claim 1, wherein said second detecting device includes a rotary disk having a cutout formed therein and fixed to said lead screw, and a photo-sensor which optically detects passage of said cutout.

9. A position control apparatus comprising:
   a) a stepping motor;
   b) a lead screw arranged to be rotated by said stepping motor being driven;
   c) a moving member arranged to move according to rotation of said lead screw;
   d) a first detecting device which detects a position of said moving member;
   e) a second detecting device which detects a rotating position of said lead screw; and
   f) a determination device which determines an amount of deviation of said moving member from a reference position on the basis of outputs from said first detecting device and said second detecting device.

10. A position control apparatus according to claim 9, further comprising a correcting device which corrects the amount of deviation determined by said determination device.

11. A focus adjustment apparatus comprising:
    a) a stepping motor;
    b) a lead screw arranged to be rotated by said stepping motor being driven;
    c) a lens holding member arranged to hold a lens for focus adjustment and to move according to rotation of said lead screw;
    d) a first detecting device which detects that said lens holding member passes a particular position;
    e) a second detecting device which detects that said lead screw passes a particular rotating position; and
    f) a determination device which determines an amount of deviation of said lens holding member from a reference position on the basis of outputs from said first detecting device and said second detecting device.

12. A focus adjustment apparatus according to claim 11, wherein said determination device determines the amount of deviation of said lens holding member from the reference position on the basis of (i) an energizing phase of said stepping motor obtained at a point of time when said first detecting device has detected that said lens holding member has passed the particular position and (ii) the number of pulses supplied to said stepping motor during a period from a point of time when said first detecting device has detected that said lens holding member has passed the particular position until a point of time when said second detecting device has detected that said lead screw has passed the particular rotating position.

13. A focus adjustment apparatus according to claim 11, further comprising a correcting device which corrects the amount of deviation determined by said determination device.

14. A focus adjustment apparatus according to claim 11, wherein a cycle in which said first detecting device detects that said lens holding member passes the particular position differs from a cycle in which said second detecting device detects that said lead screw passes the particular rotating position.

15. A focus adjustment apparatus according to claim 11, wherein said first detecting device includes a detection part provided at said lens holding member, and a sensor which detects passage of said detection part.

16. A focus adjustment apparatus according to claim 11, wherein said first detecting device includes a detection part provided at said lens holding member, and a photo-sensor which optically detects passage of said detection part.

17. A focus adjustment apparatus according to claim 11, wherein said second detecting device includes a rotary disk having a cutout formed therein and fixed to said lead screw, and a sensor which detects passage of said cutout.

18. A focus adjustment apparatus according to claim 11, wherein said second detecting device includes a rotary disk having a cutout formed therein and fixed to said lead screw, and a photo-sensor which optically detects passage of said cutout.

19. A focus adjustment apparatus comprising:
   a) a stepping motor;
   b) a lead screw arranged to be rotated by said stepping motor being driven;
   c) a lens holding member arranged to hold a lens for focus adjustment and to move according to rotation of said lead screw;
   d) a first detecting device which detects a position of said lens holding member;
   e) a second detecting device which detects a position of said lead screw; and
   f) a determination device which determines an amount of deviation of said lens holding member from a reference position on the basis of outputs from said first detecting device and said second detecting device.

20. A focus adjustment apparatus according to claim 19, further comprising a correcting device which corrects the amount of deviation determined by said determination device.

21. A camera comprising:
   a) a stepping motor;
   b) a lead screw arranged to be rotated by said stepping motor being driven;
   c) a lens holding member arranged to hold a lens for focus adjustment and to move according to rotation of said lead screw;
   d) a first detecting device which detects that said lens holding member passes a particular position;
   e) a second detecting device which detects that said lead screw passes a particular rotating position; and
   f) a determination device which determines an amount of deviation of said lens holding member from a reference position on the basis of outputs from said first detecting device and said second detecting device.

22. A camera according to claim 21, wherein said determination device determines the amount of deviation of said lens holding member from the reference position on the basis of (i) an energizing phase of said stepping motor obtained at a point of time when said first detecting device has detected that said lens holding member has passed the particular position and (ii) the number of pulses supplied to said stepping motor during a period from a point of time when said first detecting device has detected that said lens holding member has passed the particular position until a point of time when said second detecting device has detected that said lead screw has passed the particular rotating position.

23. A camera according to claim 21, further comprising a correcting device which corrects the amount of deviation determined by said determination device.

24. A camera according to claim 21, wherein a cycle in which said first detecting device detects that said lens holding member passes the particular position differs from a cycle in which said second detecting device detects that said lead screw passes the particular rotating position.

25. A camera according to claim 21, wherein said first detecting device includes a detection part provided at said lens holding member, and a sensor which detects passage of said detection part.

26. A camera according to claim 21, wherein said first detecting device includes a detection part provided at said lens holding member, and a photo-sensor which optically detects passage of said detection part.

27. A camera according to claim 21, wherein said second detecting device includes a rotary disk having a cutout formed therein and fixed to said lead screw, and a sensor which detects passage of said cutout.

28. A camera according to claim 21, wherein said second detecting device includes a rotary disk having a cutout formed therein and fixed to said lead screw, and a photo-sensor which optically detects passage of said cutout.

29. A camera comprising:
   a) a stepping motor;
   b) a lead screw arranged to be rotated by said stepping motor being driven;
   c) a lens holding member arranged to hold a lens for focus adjustment and to move according to rotation of said lead screw;
   d) a first detecting device which detects a position of said lens holding member;
   e) a second detecting device which detects a position of said lead screw; and
   f) a determination device which determines an amount of deviation of said lens holding member from a reference position on the basis of outputs from said first detecting device and said second detecting device.

30. A camera according to claim 29, further comprising a correcting device which corrects the amount of deviation determined by said determination device.

* * * * *

UNITED STATES PATENT AND TRADEMARK OFFICE
CERTIFICATE OF CORRECTION

PATENT NO.   : 6,282,380 B1
DATED        : August 28, 2001
INVENTOR(S)  : Harushiga Yamamoto It is certified that error appears in the above-identified patent and that said Letters Patent is hereby corrected as shown below:

<u>Title page,</u>
After Item [22], add
-- [30] Foreign Application Priority Data
  December 28, 1998   (JP) ………………………………. 10-372531 --.

Signed and Sealed this

Twenty-fifth Day of June, 2002

Attest:

Attesting Officer

JAMES E. ROGAN
*Director of the United States Patent and Trademark Office*